INVENTOR
DOUGLAS S. RICHART
FRITZ J. NAGEL
BY Richard O. Church
ATTORNEY

March 31, 1970     D. S. RICHART ET AL     3,503,823
METHOD FOR COATING METAL SUBSTRATES WITH THERMOPLASTIC RESING
Filed April 4, 1966     2 Sheets-Sheet 2
FIG. 2
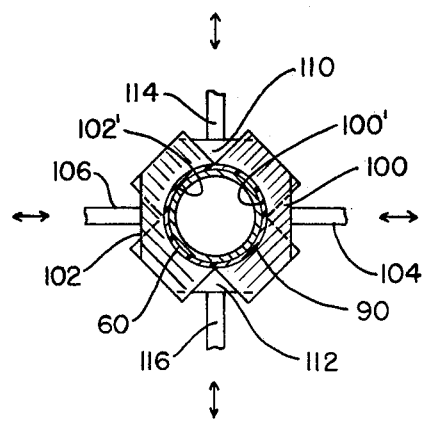
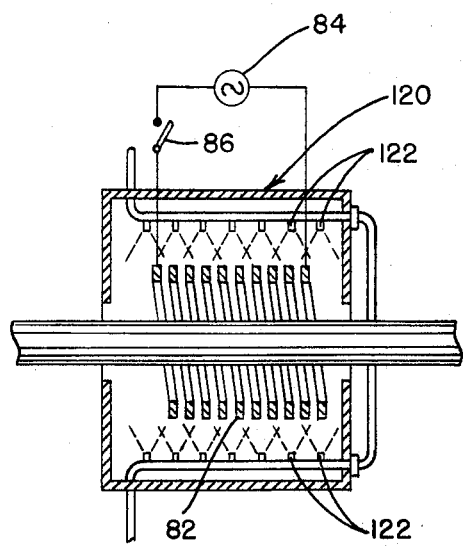
FIG. 3
INVENTOR
DOUGLAS S. RICHART
FRITZ J. NAGEL
BY
ATTORNEY United States Patent Office 3,503,823
Patented Mar. 31, 1970

3,503,823
METHOD FOR COATING METAL SUBSTRATES WITH THERMOPLASTIC RESINS
Douglas S. Richart and Fritz J. Nagel, Reading, Pa., assignors to The Polymer Corporation, a corporation of Pennsylvania
Filed Apr. 4, 1966, Ser. No. 539,940
Int. Cl. B32b *31/30*
U.S. Cl. 156—244        7 Claims

ABSTRACT OF THE DISCLOSURE

Adhesion of thermoplastic coatings to metal strip, wire and pipe is improved by extruding the coating material onto the metal and heat treating the interface between the coating and the metal at a temperature well above that at which the extrusion is done. The interface may be heated by induction methods, as well as others, and the outer surface of the coating may be concurrently cooled.

---

This invention relates to the art of extrusion coating wherein a substrate, such as strip, wire, pipe, and the like, is provided with a protective coating by extruding a continuous layer of synthetic resinous material over the surface thereof. More particularly, this invention relates to methods and means for extrusion coating whereby improved adhesion is obtained between a synthetic resinous coating and the substrate to which it is applied.

It is well known that protective coatings can be applied to elongated articles of regular cross section by extruding a protective layer over the surface thereof. This generally is accomplished in an apparatus referred to as a cross head extruder. In these devices, the substrate passes through an elongated chamber where it is surrounded by a plastic coating composition that is supplied from an extruder by means of a T connection to the chamber. The speed of advance of the substrate is generally adjusted to be faster than the rate at which the softened plastic is supplied to the chamber, and accordingly, as the substrate leaves the chamber, the softened plastic is stretched and pulled down into intimate contact with the substrate. The use of these cross head extruders is of particular value due to their ease of operation and the comparatively high speeds at which they can be operated.

Despite the convenience of these techniques, extrusion coating methods have not always proved commercially satisfactory for those applications that require a high degree of adhesion between the resinous coating and the substrate. It will be appreciated that sometimes adhesion is not desired as, for example, hookup wire should be coated in a manner that permits the insulation coating to be readily stripped from the wire. However, in other applications, the performance and utility of the protective coating may be largely dependent upon the tenacity with which the coating adheres to its substrate. This adhesion is necessary not only to prevent the coating from being peeled off of the substrate, but also to prevent the spread of underfilm corrosion should there be any discontinuity or break in the coating. Adherent coatings of this type are especially suitable for protecting a substrate as from outdoor weathering, corrosive chemical environments, and the like.

Illustrative of a particularly critical application wherein adhesion between the resinous coating material and the substrate is of great importance, there may be mentioned pipe that is prepared for underground burial. Pipe of this sort is commonly used by utility companies for such purposes as gas and water distribution lines, underground electrical conduits, and the like. To a varying degree, depending upon local conditions, the soil may be quite corrosive, and unless the buried pipe is protected by some means, the pipe may become eroded away within the span of a comparatively few years.

In order to protect the pipe from such corrosion, the pipe may be given a protective coating of resinous material that will resist attack from the elements present in the soil. Also, if the coating is electrically nonconductive, the pipe may be protected from corrosion by cathodic protection. When cathodic protection is utilized, a negative voltage is imposed upon the pipe in order to balance any electrolytic forces developed between the soil and the pipe. This method is advantageous since, if a small imperfection is present in the coating, the pipe will be protected from corrosion at that weak point by the imposed voltage. However, unless the pipe is covered quite completely and thoroughly insulated by the coating, the power requirements may become unreasonably large and it will not be practical to utilize cathodic protection. For this reason, it can be understood that it is important for the coating to adhere tightly to the pipe in order that moisture, ground water, and the like, will not work their way between the coating and the pipe and adversely affect the resistance of the pipe to ground.

In order to obtain a highly adherent coating of synthetic resinous materials, it is conventional, in many coating processes, to utilize primers. These primers, which can be comprised of a whole host of inorganic and organic compounds and combinations thereof, are most frequently applied to a substrate, preferably after it has been carefully cleaned, in the form of a solution coating. The primer is first applied to the substrate, dried, sometimes cured, and then the substrate is coated with the resinous coating material. Such coatings are commonly applied from solution, as in the case of organisols and plastisols, or may be applied in the form of pulverulent resins which then are fused by means of heat over the surface of the substrate as in electrostatic spraying, fluidized bed coating and the like. Excellent adhesion can often be obtained using these primers in these processes. For example, if the primers are properly selected, it may be possible to cause the coating layer to adhere so tightly to the substrate that the strength of the bond will exceed the film strength of the resinous coating material itself. These results can be obtained even with coating materials such as vinyls that have practically no inherent ability to adhere to a substrate.

In an attempt to obtain adhesion when using extrusion coating methods, it was at once obvious that primers should be tried. Inexplicably, even when the composition of the primers and the coating resins remained identical, the degree of adhesion obtained in extrusion coating was not comparable to that obtained with other coating methods. In point of fact, the degree of adhesion that has heretofor been obtainable by using extrusion coating methods is so poor as to render this type of coating process practically valueless when resistance of the substrate to outdoor weathering and corrosion is required.

Accordingly, it is an object of this invention to provide methods and means whereby adherent coatings can be obtained when utilizing extrusion coating processes.

Another object of this invention is to provide methods and means whereby adherent coatings of synthetic resinous material can be applied to elongated articles of regular cross section, such as strip, wire, pipe, and the like.

A further object of this invention is to provide methods and means for adhering a coating to a substrate when extrusion coating methods are used.

Briefly, these and other objects of this invention are achieved by utilizing a special adhesion promoting heat treatment step that exposes the coated substrate, at least at the interface between the substrate and its coating, to elevated temperatures that are in considerable excess of those at which the softened coating material is extruded onto the substrate.

The adhesion promoting heat treatment step of this invention can be performed in several different ways. For example, the substrate may be preheated to the required temperature prior to the time that it passes through the cross head extruder. While adequate adhesion can be obtained using this method, it is not the preferred method of this invention due to certain practical considerations. First, it is somewhat more difficult to manipulate a hot substrate than a cold one. Second, control over the temperature of the substrate is more difficult to maintain since there will be some time delay between the time the substrate is heated and the time it enters the coating die. For example, if the substrate is first heated in an oven, the substrate must be transferred from the oven to the extruder, and during the course of this transfer, the substrate will lose heat. Since the amount of heat that will be lost during this transfer will depend, in part, upon ambient conditions, the heat capacity of the substrate, and the speed of the line, the temperature of the substrate may be subject to undesirable temperature fluctuations. Third, extrusion coating operations are made more difficult when the substrate is preheated to a temperature above the normal extrusion temperatures for the softened resinous coating materials. It can be understood that these elevated temperatures will reduce the viscosity of the extrudate to such an extent that it may be difficult to control the thickness of the coating and to avoid any pin holes or "holidays" in the coating. As mentioned above, the substrate is moved through the coating die at a rate slightly faster than that at which the molten coating material is being fed to the die. By this means, the coating material is caused to pull or neck down into intimate contact with the surface of the substrate. However, when the substrate is heated to temperatures in material excess of those at which the plastic coating material becomes softened for extrusion, the effect is to reduce the viscosity of the plastic film to a point where it may tear or break when it is being pulled down against the surface of the substrate. Even though the film does not tear or rupture, it is extremely difficult to control the uniformity of the film thickness when extruding in this manner.

By another alternative method, the present invention has been successfully practiced by placing a substrate that has been coated by extrusion coating processes in a high temperature oven. After the coated substrate is brought up to the temperatures required to obtain adhesion, it is then removed from the oven. This process, while sometimes more satisfactory than preheating the substrate, also has practical difficulties. First, it may require rather large heating ovens. Second, exposure of the coating to relatively high temperatures for extended periods of time can degrade or otherwise damage the coating. Third, it is difficult to handle the coated substrate after it leaves the oven until both the coating and the substrate have cooled to below the softening point of the coating. It can be appreciated that if the heat capacity of the substrate is large, this cooling time may be quite long.

A preferred and perhaps more convenient method for obtaining the required adhesion promoting temperatures is to utilize techniques that do not require the total mass of both the substrate and the coating to be heated. As previously mentioned, in order to promote adhesion, it is necessary to provide the required temperatures only at the interface between the coating and the substrate. As can readily be appreciated, if the heating can be confined to these surface boundaries, an absolute minimum of energy will be required to perfect adhesion in accordance with this invention. Not only will the energy requirements be minimized, but also the coated substrate will remain at a lower overall temperature, thus eliminating, or at least greatly simplifying, subsequent cooling of the substrate. Further, since the coating will not be exposed to a high temperature for a prolonged period of time, handling problems are greatly simplified and the possibility of an undesired degree of degradation may be avoided. By way of example, the following are illustrative of these techniques for obtaining partial or localized heating.

DIELECTRIC HEATING

Dielectric heating may be used to heat only the coating layer itself. While the surface of the coating layer will be exposed to the required elevated temperatures to obtain adhesion, it will quickly lose its heat to the substrate after the dielectric heating is discontinued. For example, if the substrate is a metal pipe and the coating is a 10 to 30 mil layer of plastic, as is conventional, it can be appreciated that the heat capacity of the metal substrate will far exceed that of the coating, and thus, after the dielectric heating is discontinued, the coating layer will rapidly be cooled to below its softening point.

RESISTANCE HEATING

In a somewhat analogous manner, if the substrate is comprised of a metal, resistance heating may be used to selectively heat the substrate. While this type of heating is desirable due to its inherent efficiency, it may be undesirable if the heat capacity of the substrate is in considerable excess of that of the coating. In this case it may be difficult to cool the coated article and the coating may be exposed to temperatures in excess of its softening point for an undesirably long period of time. This may be alleviated, at least in part, if the resistance heating is conducted while the coated substrate is submerged in a heat transfer medium such as an insulating oil, or if high frequency currents, e.g., from about 50 kilocycles to about 5 megacycles, are utilized. In this latter case, as discussed below with respect to induction heating, case or skin heating may be achieved.

ULTRASONIC HEATING

The use of ultrasonics for heating various materials is a comparatively recent development. In the case of a coated substrate, it enables generation of heat within a comparatively thin region at the interface between the coating layer and the substrate. For this reason, ultrasonic heating is especially desirable since it enables supplying the required heat to the substrate without affecting the overall temperature of the coated substrate to any material extent.

INDUCTION HEATING

Lastly, as another example of a method for obtaining localized heating, there should be mentioned induction heating. When this is utilized, particularly if the frequencies are high, e.g., in a range from about 50 kilocycles to 5 megacycles, substantially only the outer skin of the substrate will be heated. Thus again, as with resistance and ultrasonic heating, it may be possible to provide localized heat only at the coating interface, thus making possible economies in both the heating and cooling requirements. An additional advantage may accrue through the use of induction heating since the induction coils may conveniently be submerged in a heat exchange liquid, such as water, so that the surface of the coating will be kept cool and below its softening point while heat is being supplied to perfect the adhesion.

In the drawings:

FIG. 2 is a sectional view, taken substantially along line II—II of FIG. 1;

FIG. 3 is a somewhat diagrammatic illustration, partially in section, of a modification of a portion of the apparatus shown in FIG. 1.

Figure 1:
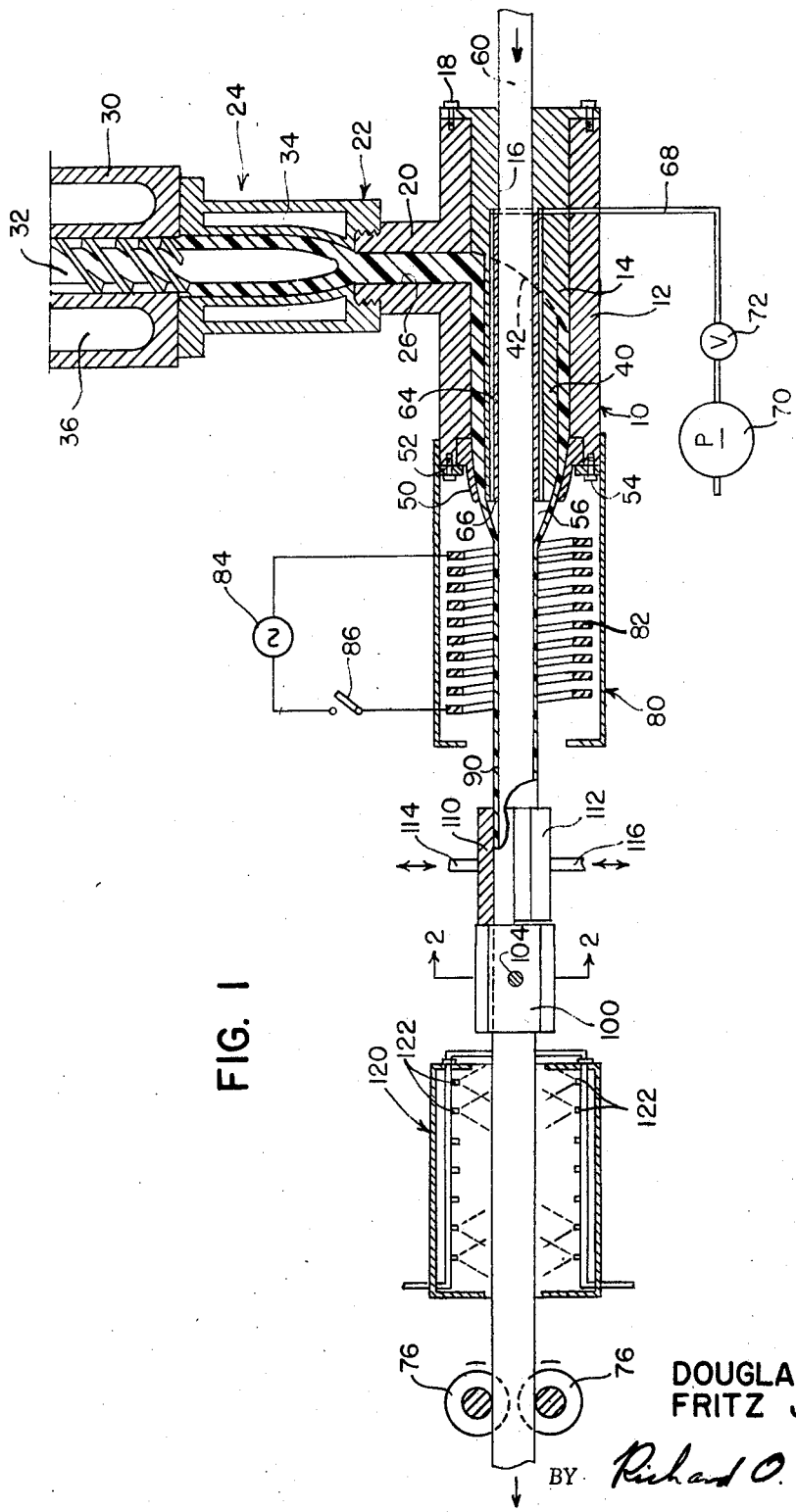
FIG. 1 is a somewhat diagrammatic illustration, partially in section, of apparatus useful in the practice of the present invention.

With reference to the drawings, the forming die is indicated generally by the reference numeral 10 and includes an outer casing 12 having a passageway extending therethrough which receives a sleeve 14 having a cylindrical bore 16, the sleeve 14 being secured to casing 12 by suitable securing members 18.

The die head also includes a laterally extending shank portion 20 which is threaded to engage the nozzle 22 of a conventional extruding machine indicated generally by reference numeral 24. Shank 20 is provided with a bore 26 through which the plastic material may flow from the nozzle of the extruding machine.

The extruding machine is of relatively conventional construction and includes a body 30 having a feed screw 32 disposed within the central bore therewithin, the feed screw being connected with suitable driving mechanism, the speed of which may be adjusted. Suitable chambers 34 and 36 are provided in the nozzle and the body respectively for receiving a suitable heating medium such as steam which may be provided from a conventional steam generator.

The plastic material, usually in powdered or granular form, is fed through the extruding machine by the feed screw, during which time it is continuously heated until it is of flowable or extrudable form by the time it reaches the nozzle. Sufficient heat is, of course, applied to enable the material to retain its flowable characteristics until it passes out of the forming die and onto the substrate to which it is to be applied.

The sleeve 14 includes a portion 40 of reduced diameter defining with the inner surface of casing 12 a space through which the plastic material may flow in a direction extending longitudinally of the sleeve. The reduced portion of the sleeve starts adjacent passageway 26 and is preferably joined to the main portion of the sleeve by a curved wall 42 which operates to assure a smooth flow of plastic material and to change the direction of travel thereof within the head.

In order to provide the extruded plastic material with the tubular shape, a nozzle in the form of an annular member 50 is clamped to the head by a ring member 52 which may be secured in place by suitable securing members 54. With this arrangement, the cross sectional area of the tubular extruded material is gradually reduced and emerges from the head at approximately the same point as the article which is moving through the passageway, this article in the present instance being indicated by reference numeral 60 and comprising a hollow pipe or any similar metallic article.

It will be noted that the cross sectional size of the plastic material as it emerges from the forming die is larger than the cross sectional size of the article 60, thereby providing a space 56 therebetween. If desired, the article can be caused to travel slightly faster than the rate at which the plastic material is flowing to thereby cause the material to stretch and be pulled down into contact with the substrate.

A plurality of longitudinally extending passages 64 are provided within sleeve 14, these passages opening through the outer end 66 of the sleeve and also being connected with a conduit means 68 which in turn is operatively connected with a vacuum pump 70, a control valve 72 being connected in line 68.

With this arrangement, a vacuum can be created in the space 56 during operation of the apparatus to assure that no gas is entrapped between the plastic coating material and the outer surface of the substrate, thereby preventing bubbles from forming between these two components of the finished product and insuring their intimate contact at all points along the interface.

It will be understood that any suitable mechanism may be employed for moving the substrate through the apparatus, and, as illustrated in the drawing, a pair of opposed rollers 76 are provided for this purpose, it being understood that any other suitable conventional mechanism may be as well employed.

A post-heater mechanism is indicated generally by reference numeral 80 and is disposed adjacent the exit portion of the extruding apparatus and extends longitudinally therefrom, it being apparent that the coated substrate passes through the post-heater after the plastic layer is extruded onto the outer surface of the metallic article.

This heater mechanism is an induction heater of conventional construction and includes an induction coil 82 disposed in surrounding relationship to the coated substrate as it passes through the heater mechanism. The induction coil 82 is connected with a suitable source of high frequency alternating current as indicated by reference numeral 84, a switch 86 being connected in the circuit for controlling the operation of the heating mechanism.

The induction coil 82 will serve to insure that the outer surface of the article is heated as well as the inner surface of the coating whereby the two abutting surfaces are heated. The heater is designed to raise the interface between the article and the coating to a temperature within a range of approximately 400° F. to 750° F., and more preferably, in a range of from about 550° F. to 700° F. if the coating material is comprised of polyvinyl chloride.

After the heated product leaves the heater mechanism, it may, if desired, be engaged by suitable pressure means for exerting an inwardly directed pressure on the outer plastic coating. As shown in FIGS. 1 and 2, this pressure means includes a first pair of pressure members 100 and 102 having inner substantially semicylindrical arcuate surfaces 100' and 102' respectively, these inner surfaces being adapted to engage the outer surface of the plastic coating. Rods 104 and 106 are connected with pressure members 100 and 102 respectively, these rod members being suitably connected with pressure operated means such as hydraulic rams whereby the pressure members can be forcefully moved into the operative position as shown wherein they intercooperate to define a substantially cylindrical inner surface which is adapted to apply pressure to the outer surface of the coating 90 on the outer surface of substrate 60.

It is apparent that the amount of pressure applied to the outer surface of the coating layer 90 can be adjusted by adjusting the operation of the pressure members 100 and 102 to move them toward or away from one another as the case may be.

Two additional pressure members 110 and 112 are provided, these pressure members being disposed at substantially 90° offset angles with respect to the position of pressure members 100 and 102. Rod members 114 and 116 are operatively connected with pressure members 110 and 112 respectively and are connected with suitable power operated means such as hydraulic rams for forcing the pressure members 110 and 112 toward and away from one another as desired.

While particular pressure members have been illustrated in the drawing, it will be understood that various other means may be employed for applying pressure to the outer surface of the coating material. For example, the conventional bag molding procedure may be employed for this purpose, and staggered rollers or pressure rings and shoes may be employed for applying suitable pressure. In addition, the pressure may be applied by means of fluid or gas mediums pressing against the outer surface of the coating.

The coated substrate is cooled after passing through the pressure mechanism, and a cooling mechanism for this purpose is indicated generally by reference numeral 120 and includes a plurality of spray nozzles 122 which are adapted to spray cool water on the outer surface of the coated substrate passing therethrough.

A slightly different variation of the apparatus is shown in FIG. 3 wherein the induction coils 82 are located directly within the cooling mechanism 120. This has been found to be a convenient arrangement since it enables cooling the surface of the coating at the same time that the interface between the substrate and the coating is being heated. Accordingly, the surface of the coating will not reach such an elevated temperature that could cause degradation or soften the coating to such an extent that it would be difficult to handle the coated substrate as at the pinch rolls 76.

It is generally convenient to adjust the rate at which water is being fed to the cooling chamber 120 to be sufficiently great so that all or at least a significant portion of the coated substrate is submerged. It will be appreciated that if this is done, a great deal of water will spill out of the open ends of the cooling mechanism. This is of no consequence, however, as it is a simple matter to collect the water and recycle back through the spray nozzles 122.

EXAMPLE I

A vinyl coating composition was prepared by melt mixing the following ingredients together (the amounts listed are in parts by weight per 100 parts of resin).

| | |
|---|---|
| Polyvinyl chloride resin | 100 |
| Dioctylphthalate | 45 |
| Epoxidized soya oil | 5 |
| Titanium dioxide | 5 |
| Calcium sulfate | 10 |
| Barium/cadmium laurate | 3 |
| Dibasic lead phosphate | 1 |

After the above ingredients were thoroughly mixed, they were chopped into molding granules suitable for feeding to a mixing extruder.

Lengths of one inch OD pipe were carefully cleaned and dip coated with a vinyl primer. The primer used was a solution of an acrylonitrile, butadiene, rubber phenolic resin (sold by Compo Chemical Co. under the trade designation Primer XA2–131–1) which was reduced with a solvent mixture of xylene, toluene, propyl acetate, butyl acetate, ethanol, and certain proprietary solvents (sold by the Celanese Corporation under the trade designation Solvents 601 and 901–H).

After the primer had dried, the pipe was coated with the above coating composition through the use of a cross head extruder. The speed at which the pipe was fed through the extruder was about 10 feet per minute and the temperature of the vinyl coating material at the extrusion head was about 340° F. The pipe fed to the extruder was at ambient temperature and no special adhesion promoting heat treatment was given the coated pipe.

Upon inspection, the extruded vinyl coating looked smooth and glossy and was free from pin holes. However, when a V-shaped notch was cut in the coating, it was found that the coating layer could be peeled off of the pipe without difficulty.

EXAMPLE II

A length of pipe that was coated in accordance with Example I was placed under the influence of an induction heating coil. The coated pipe was rapidly heated to a temperature in the range of from about 500–600° F. and immediately quenched in a water bath. The appearance of the coating was not damaged and, when a notch was cut in the coating as in Example I, it was found that the coating layer could not be peeled away from the pipe. The adhesion was rated as excellent since the adhesive strength of the bond between the pipe and the vinyl coating exceeded the cohesive strength of the vinyl coating.

EXAMPLE III

The experiment performed in Example I was duplicated except that the pipe was preheated in an oven for 1½ minutes at 1200° F. immediately prior to the time it was passed through the cross head extruder. As in Example II, the adhesion was excellent and the vinyl coating could not be peeled off of the substrate.

In the above description of the drawings and examples, the invention has been discussed with respect to the coating of pipe since this is thought to be an excellent example of the utility of this invention. It should be understood that while in the examples the pipe was coated at a rate of only 10 feet per minute, much higher rates, such as 100–200 feet per minute, can be achieved. Further, in the case of substrates having a relatively small surface area, such as wire, these coating rates may be increased much further. For example, rates of from 1000–2000 feet per minute can be maintained without difficulty, and rates as high as 4000–5000 feet per minute are possible. The upper limit for these rates is largely dependent upon the extruder and the speed with which it can heat the plastic coating material and feed it to the extrusion die. It can also be appreciated that the coating speed may be limited in practicing this invention by the rate at which the coated articles can be brought to the adhesion promoting temperatures.

It should be mentioned that the development of adhesion between the substrate and the coating is influenced by the time that the interface is exposed to the required temperatures. In other words, as the temperatures utilized are increased, the time that the interface must be maintained at a given temperature can be reduced. For example, it will be necessary to run the coating operation at a slower rate if the interface temperature is about 400° F. than if the interface temperature is significantly higher, for example, 1000° F. For this reason, no exact temperature can be set forth that should be utilized in practicing this invention, but an optimum temperature can readily be determined by anyone skilled in the art in a given instance when the various factors such as the type of coating composition, the primer, and the desired speed at which the line is to run are known.

In the above description, the only coating composition that has been disclosed is comprised of polyvinyl chloride. This is not intended to be limiting, but rather to be illustrative of a preferred coating material. It should be understood that any of the conventional thermoplastic coating resins, such as polyamides, cellulosics, polyacetals, polyolefins, and the like, can be used. Also, in some instances, certain thermosetting resins such as epoxies can be used. As noted above, however, the required adhesion promoting temperatures must be adjusted for each different resin system.

The term "substrate" as used herein denotes any material on which a layer of coating is desired by means of extrusion coating technique. Such material may or may not have a coating thereon, for instance, a pipe, a pipe with a primer thereon, a wire or a galvanized wire.

We claim:

1. A method for obtaining adhesion when coating a primed metal substrate with a synthetic thermoplastic resinous material comprising softening the resinous material to render it flowable under pressure by raising it to an extrudable temperature, extruding said softened and pressure flowable resinous thermoplastic material onto said metal substrate at said extrudable temperature, thereafter raising the temperature of the interface between the resinous thermoplastic material and the metal substrate by induction heating to a temperature well above said extrudable temperature and cooling the outer surface of said resinous thermoplastic coating to a temperature below its softening temperature.

2. A method according to claim 1 in which compacting pressure is applied to said resinous coating prior to cooling thereof.

3. A method according to claim 1 in which the temperature of the interface is raised at the same time the outer surface of the resinous coating is cooled.

4. A method for obtaining adhesion when coating a primed metal substrate with polyvinyl chloride resin comprising softening the polyvinyl chloride resin to render it flowable under pressure by raising it to extrudable temperature extruding said softened and flowable polyvinyl chloride resin onto said metal substrate at said extrudable temperature, inductively heating the resin-metal interface after establishment thereof to a temperature between 400° F. and 750° F., and cooling the outer surface of said polyvinyl chloride coating to a temperature below its softening temperature.

5. A method according to claim 4 in which compacting pressure is applied to said polyvinyl chloride coating after extrusion thereof but prior to raising the temperature of the interface between it and the metal surface.

6. A method according to claim 5 in which cooling liquid is contacted with said coating concurrently with inductive heating of said interface.

7. A method according to claim 4 and further including supporting said metal substrate with the extruded polyvinyl resin thereon at a point in regions separate from regions in which said resin metal interface is inductively heated, and further including contacting cooling liquid with said coating during inductive heating of said interface.

References Cited

UNITED STATES PATENTS

| | | | |
|---|---|---|---|
| 3,019,126 | 1/1962 | Bartholomew | 117—93.2 X |
| 3,068,119 | 12/1962 | Gotsch | 117—93.2 |
| 3,075,868 | 1/1963 | Long | 156—282 X |
| 3,140,196 | 7/1964 | Lacy et al. | 156—244 |
| 3,274,037 | 9/1966 | Nixon | 156—73 X |
| 3,323,965 | 6/1967 | Hanle et al. | 156—244 |
| 3,402,086 | 9/1968 | Smith et al. | 161—216 |

JOHN T. GOOLKASIAN, Primary Examiner

J. D. SMITH, Assistant Examiner

U.S. Cl. X.R.

117—93.2; 156—272, 273; 161—216